Patented July 16, 1940

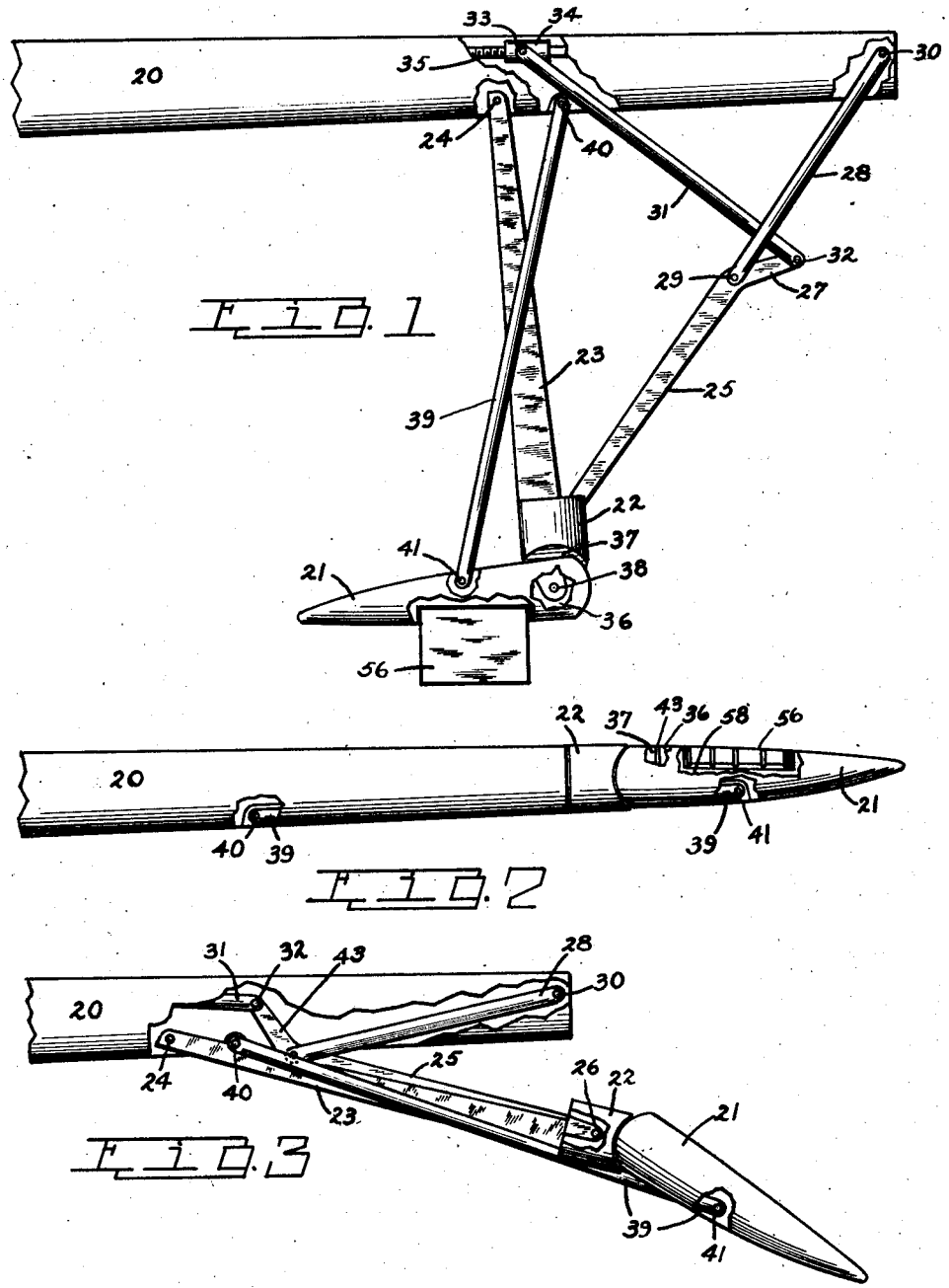
July 16, 1940.  A. B. HERB  2,207,735
RETRACTABLE WING-TIP FLOAT
Filed May 16, 1939  4 Sheets-Sheet 1
INVENTOR
ALFRED B. HERB

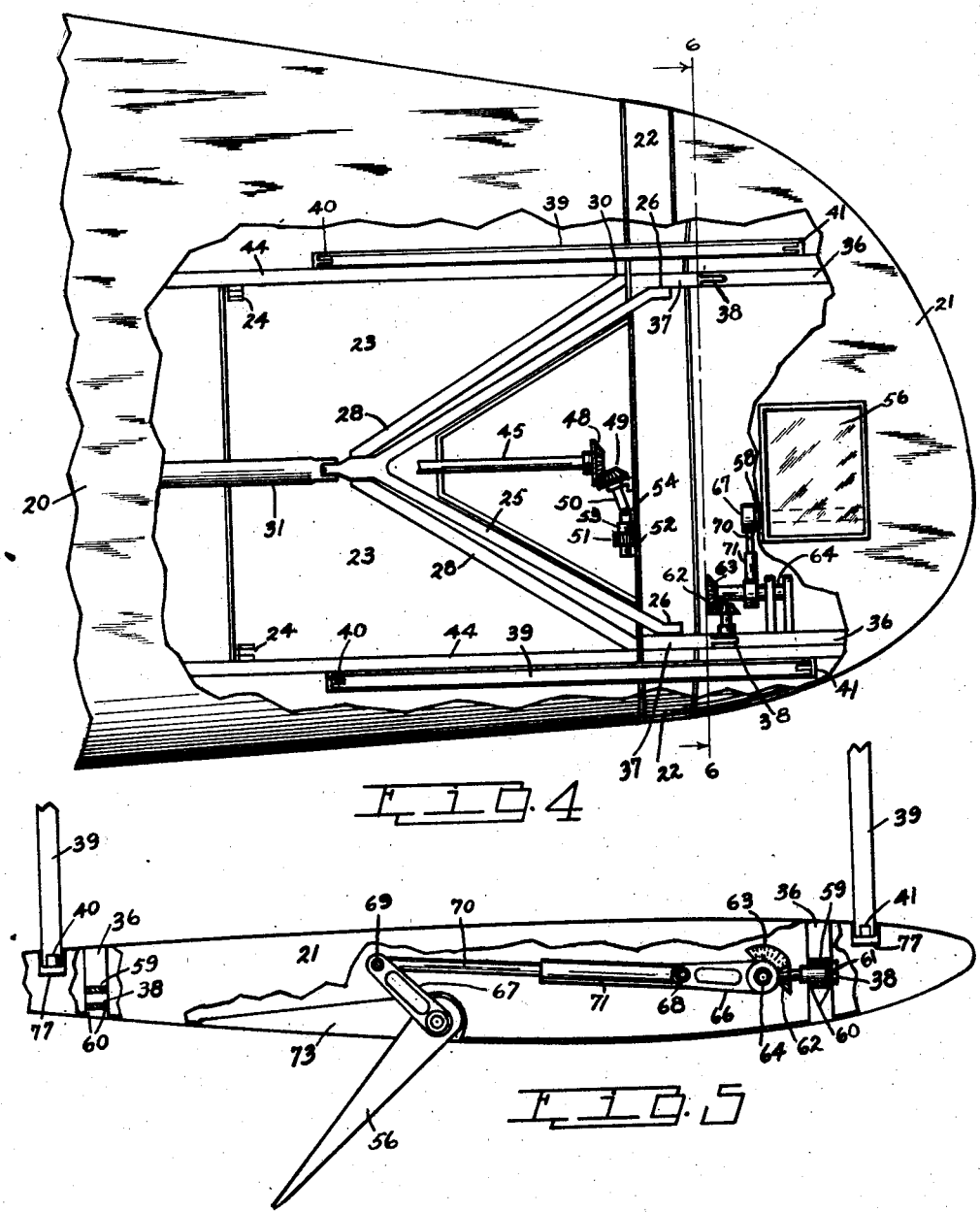

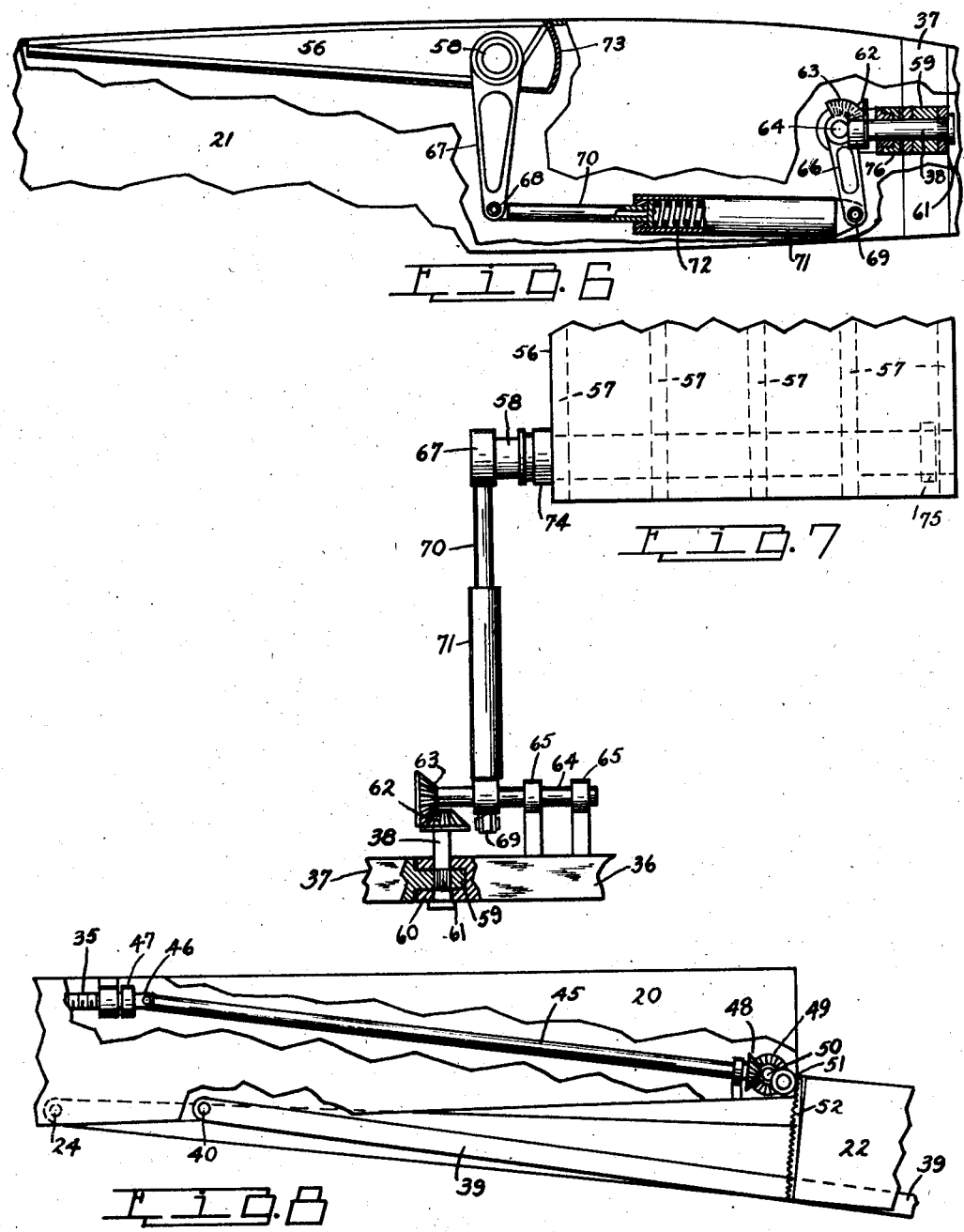

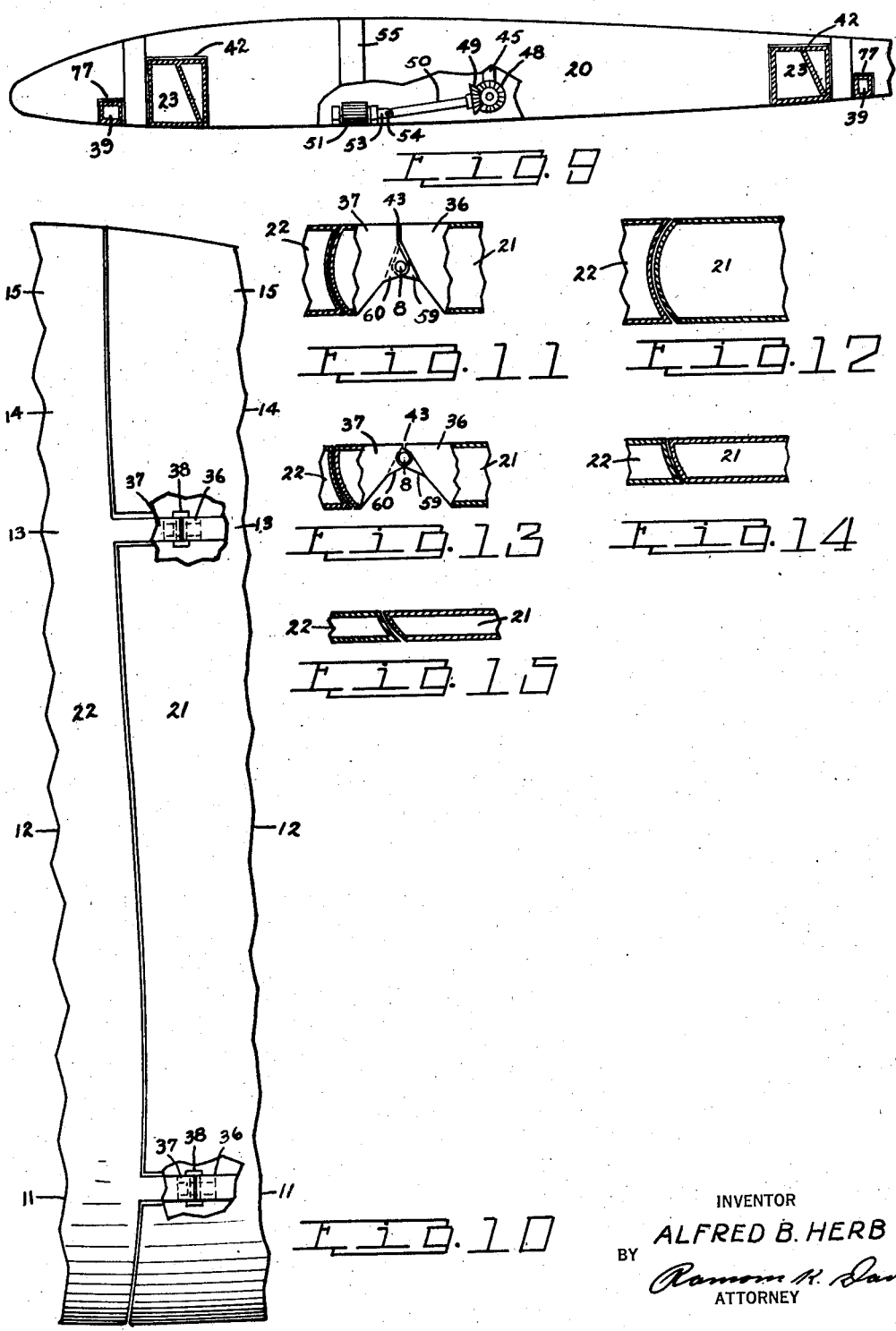

2,207,735

UNITED STATES PATENT OFFICE 2,207,735

RETRACTABLE WING-TIP FLOAT

Alfred B. Herb, United States Navy

Application May 16, 1939, Serial No. 273,862

10 Claims. (Cl. 244—102)

(Granted under the act of March 3, 1883, as amended April 30, 1928; 370 O. G. 757)

In general the invention relates to a wing-tip float for aircraft that may be moved from its flight position at the end of the wing of the aircraft to a position below the fixed part of the wing to serve as a float when the aircraft is at rest on water, and which, when in flight position, will offer no additional profile drag to the aircraft.

An object of the invention is to provide a retractable wing-tip float for an aircraft that will effect proper lateral flotation stability while the air craft is resting or maneuvering on water.

Another object of the invention is to provide a retractable wing-tip float for aircraft which, when in position for landing, is located near the extreme end of the wing, this location requiring least buoyancy.

A further object of the invention is to provide a retractable wing-tip float having a broad planing surface operable therewith to produce dynamic lift for stability while the aircraft is maneuvering on water.

With the above and other objects in view the invention consists in the construction, combination and arrangement of parts as will be described more fully hereinafter.

Reference is to be had to the accompanying drawings, forming a part of this specification, in which like reference characters indicate corresponding parts throughout the several views and in which Fig. 1 is a front elevation, parts being broken away, of a wing-tip float in position for landing, Fig. 2 is a similar view of the wing-tip float in flight position, Fig. 3 is a similar view showing the wing-tip float midway between landing and flight positions, Fig. 4 is a top plan view partly broken away to show the wing-tip float in flight position, Fig. 5 is a side elevation of a portion of the wing-tip float, partly broken away, showing the planing surface in landing position, Fig. 6 is a fragmentary side elevation of the wing-tip float in flight position showing the planing surface operating mechanism, looking in the direction of the arrow in Fig. 4, Fig. 7 is a top plan view of the planing surface and its operating mechanism, Fig. 8 is a fragmentary front view of an aircraft wing partly broken away showing the mechanism for retracting the wing-tip float, Fig. 9 is an end view of an aircraft wing, partly in section and partly broken away, showing the position of the wing-tip float supporting members when it is in flight position, Fig. 10 is a fragmentary plan view of the wing-tip float showing the joints interconnecting the two float sections, Fig. 11 is a section on the line 11—11 of Fig. 10,
Fig. 12 is a section on the line 12—12 of Fig. 10,
Fig. 13 is a section on the line 13—13 of Fig. 10,
Fig. 14 is a section on the line 14—14 of Fig. 10, and
Fig. 15 is a section on the line 15—15 of Fig. 10.

Although the drawings show and the following description will be directed to but one wing-tip float, it will be understood that there is to be a float associated with each end of the lower wing of the aircraft.

Referring more particularly to Figs. 1, 2 and 3 of the drawings wherein the wing-tip float is shown in its landing, intermediate and flight positions, 20 designates a wing of an aircraft to which the float of the present invention, consisting of sections 21 and 22, is mounted to serve as a wing-tip while the aircraft is in flight and a means of support while the aircraft is at rest or in maneuvering on water. The section 22 of the float is swingedly supported from the wing by a drag panel 23 pivoted to the wing at the points 24, and a V-shaped brace 25 pivotally connected to the section 22 at the points 26 (Fig. 3). By referring to Fig. 1 it will be noted that the free end of the brace is slightly off-set from the longitudinal axis of the brace, as at 27, and to one end of this off-set portion a second V-shaped upper strut 28 is pivotally connected at 29, and which is also pivotally connected to the wing 20 at the points 30. One end of a link 31 is pivotally mounted at 32 to the free end of the off-set portion 27 while its opposite end is connected to a trunnion 33 mounted on a nut 34 operable on a screw-shaft 35.

As may be seen in Figs. 1 and 5 the section 21 of the float is streamlined both fore and aft and abeam, and is connected to the section 22 by beams 36 attached to section 21, and beams 37 attached to section 22, the beams being hingedly connected by hinge-pin 38, more clearly seen in Fig. 4. Again referring to Figs. 1 and 4, the section 21 is swingedly supported from wing 20 by struts 39 pivoted at 40 to the wing and at 41 to the section 21.

To raise the wing-tip float from the landing position shown in Fig. 1 to the flight position of Fig. 2, the screw-shaft 35 is caused to turn by any suitable source of power (not shown) moving the nut 34 towards the left, as viewed in Fig. 1, carrying with it the trunnion 33 and the thereto connected end of the link 31. As the link is drawn to the left by the nut, the joint at 29 is broken and a torque is produced thereabout producing a lifting force that raises the float section 22. During the raising of the section 22 movement of the drag panel about its pivots 24 effects an increase in distance between the pivot points 24 and 41 causing struts 39 to produce angular movement of float section 21 relative to float section 22. Proper length of struts 39 and locations of the pivot points 24, 40 and 41 will bring the section into longitudinal alinement with the section 22 when the latter is in alinement with the wing 20, as in Fig. 2. Such proper lengths of and positioning of the pivot points for the members connecting the sections of the float to the wing will produce movement of the inboard section through an arc of approximately 90 degrees and at the same time the outboard section will move through an arc of approximately 180 degrees, so that when the sections are in landing position (Fig. 1) they will be substantially at right angles to one another, and when in flight position will be in alignment (Fig. 2).

When in continuous flight position, aerodynamic lift forces on the float section 21 are transferred to the beams 36 and from thence through the hinge-pin 38 to beams 37 (Fig. 4). Lift forces on the float section 22 are transferred to beams 37, and the combined lift forces on both float sections are thus transferred to the drag panel 23, which in turn transfers lift force to the end of the wing 20 at recesses 42 into which the legs of the drag panel set when in flight position, as more clearly seen in Fig. 9. Bending moment due to lift force on the float section 21 produces compression force at the point 43, Figs. 2, 11 and 13, which is at the meeting faces of beams 36 and 37, and produces a tension force in struts 39. Compression force is transferred through beams 37, drag panel 23 and pivot point 24 to wing beams 44.

The mechanism for lowering the float to its landing position which is separate and distinct from the raising means, is more clearly shown in Figs. 4, 8 and 9, and includes a shaft 45 coupled to the screw-shaft 35, from which it derives its power, by a flexible coupling 46. Shaft 45 carries a bevel gear 48 that meshes with gear 49 mounted on shaft 50, which in turn drives stub-shaft 53 through a flexible coupling 54. A pinion 51 mounted on and rotatable with the stub-shaft 53 engages with a gear sector 52 on the in-board surface of float section 22 to start the downward movement of the float section. When the float has lowered itself to the position where the upper limit of the gear sector has been reached by the pinion 51, continuation of the downward movement of the float is effected by the brace 25, upper strut 28, link 31 and screw-shaft 35. Hence, with the parts as shown in Fig. 8, that is with pinion 51 at the top of gear sector 52, continuity of wing 20 with the float is broken, lift forces on the float sections are reduced and the members 25 and 28 have reached a position of greater mechanical advantage, thus continuing movement of the float to landing position. The gear sector 52 is receivable in a recess or groove 55 when the float is in flight position.

To assist in overcoming the lift forces acting upon the wing-tip float when it is desired to lower the float, use is made of a ratchet assembly 47 of any suitable type effectively operable upon shaft 45. That is to say, on the initial lowering movement of the float power is transmitted from screw-shaft 35 to shaft 45 through the ratchet assembly. Of course, the ratchet transmits power in but one direction, and idles on the upward movement of the float. This ratchet assembly, likes the one disposed in the mechanism for operating the float on the other end of the wing, being free to idle on the upward movement of the float, permits the two floats to raise in unison, so as to attain their proper position with relation to the stationary wing structure without impedance.

A planing surface 56, which is controlled automatically by the relative movement of float sections 21 and 22, is mounted in the former section in such position that when the float forms a wing-tip, as in Figs. 2 and 6, its surface is flush with that of the float section to eliminate wind resisting protrusions. The planing surface is employed to prevent damage to the float assembly while operating in rough water or while moving over the water at high speeds. It consists of a plurality of spaced parallel ribs or supports 57 covered by a suitable material to present a smooth flat surface, and it is secured to a torque tube 58 that is caused to rotate by the relative movement of float section 21 with respect to float section 22 about hinge-pin 38. As may be seen more clearly in Figs. 6 and 7, hinge-pin 38 passes through the dovetailed parts 59 and 60 of beams 37 and 36 respectively, and is caused to turn with the former by spline 61. As the hinge-pin is rotated it carries with it bevel gear 62 that meshes with a similar gear 63 keyed or otherwise secured to shaft 64 journaled in supports 65. This latter gear and shaft control the movement of an arm 66 secured to the shaft 64, which in turn controls the movement of an arm 67 keyed or otherwise secured to the torque tube 58 through a hydraulic strut member consisting of parts 70 and 71 connected to their adjacent arms by bearing pins 68 and 69 respectively. While I have shown a strut member employing a spring 72 intermediate the retractable parts, other types may be successfully used, as its purpose is to prevent damage to the planing surface from sudden or excessive impact with water when landing. As may be seen more clearly in Fig. 6 the planing surface is seated in a recess 73 in the float section when in flight position, which recess is desirably made watertight to prevent the ingress of water into the interior of the float section. A suitable watertight stuffing box and assembly 74 and a bearing 75 support the torque tube, and also a watertight stuffing box assembly 76 prevents the entry of water to the interior of the float section around hinge-pin 38. The planing surface is so mounted that when it is in position for landing on water, it will project at an angle of substantially 45 degrees to the rear of the carrying section, as will be seen more clearly in Fig. 5.

When the aircraft is in flight and the wing-tip float is in its uppermost position, the struts 39 are seated in recesses 77.

It will be understood that the above description and the accompanying drawings comprehend only the general and preferred embodiment of my invention and various changes in details of construction, proportion and arrangement of parts may be made within the scope of the appended claims without sacrificing any of the advantages of my invention.

The herein described invention may be manufactured and used by or for the Government of the United States of America for governmental purposes without the payment of any royalty thereon or therefor.

What I claim as new is:

1. In an aircraft, a retractable wing-tip float consisting of a plurality of relatively movable sections, a planing surface pivotally mounted on one of the sections, means for raising the float to flight position, and means for lowering the float to landing position.

2. In an aircraft, a retractable wing-tip float consisting of a plurality of relatively movable sections, a planing surface carried by one of said sections, means for effecting a change in position of the planning surface by the relative movement of the sections, means for raising the float to flight position, and means for lowering the float to landing position.

3. In an aircraft, a retractable wing-tip float consisting of an inboard and an outboard section, the inboard section being movable through an arc of approximately 90 degrees from its position for flight to its position for landing, the outboard section having a movement relative to the inboard section of approximately 90 degrees thereabout as the inboard section is being moved, and means for controlling the movement of the inboard section.

4. In an aircraft, a retractable wing-tip float consisting of an inboard and an outboard section, the former being pivotally mounted to the aircraft wing for movement of approximately 90 degrees from flight position to landing position, the latter being hinged to the inboard section to have movement through approximately 90 degrees relative to the inboard section as the latter is being moved, means pivotally connecting the outboard section to the wing to induce said relative movement, and means to impart movement to the inboard section.

5. In an aircraft, a retractable wing-tip float consisting of an inboard and an outboard section having relative movement, a planing surface carried by the outboard section, said surface being flush with the surface of the said section when the float is in flight position and projecting at an angle therefrom when the float is in landing position, means for lowering and means for raising the float, and means automatically controlling the planing surface during movement of the float.

6. In an aircraft, a retractable wing-tip float including an inboard and an outboard section relatively movable with respect to each other as the float is moved from its flight to landing or landing to flight positions, means fixedly attached to the inboard section and pivotally mounted on the wing to swing said section through an arc of 90 degrees, means for operating the first said means, struts pivotally connected to the outboard section and to the wing to swing said section through an arc of 180 degrees as the inboard section is moved, hinged struts connecting the sections of the float, and an automatically operated planing surface carried by the outboard section.

7. In an aircraft, a retractable wing-tip float including an inboard and an outboard section, hinged struts connecting said sections, means for imparting relative movement to the sections as the float is moved from its flight to landing or landing to flight positions, a segment carried by the abutting surface of the outboard section, a pinion operable over the segment to control the movement of the said section, means for operating the pinion, a planing surface carried by one of the sections, and means for automatically operating the planing surface during the relative movement of the sections.

8. In an aircraft, a retractable wing-tip float including an inboard and an outboard section, hinged struts connecting the sections, independent means for operating the float, a pivoted connection between the outboard section and the wing to produce relative movement between the sections as the float is moved, a planing surface carried by the outboard section, and means on the strut hinges to automatically control the planing surface during movement of the float.

9. In an aircraft, a retractable wing-tip float including an inboard and an outboard section, hinged struts connecting the sections, independent means for operating the float, a pivoted connection between the outboard section and the wing to produce relative movement between the sections as the float is moved, a planing surface carried by the outboard section, and means on the strut hinges to automatically control the planing surface during movement of the float, said last means comprising a splined joint.

10. In an aircraft, a retractable wing-tip float including an inboard and an outboard section relatively movable one to the other, means for lowering and means for raising the float, a planing surface carried by one of the sections, a torque tube on which the planing surface is mounted, an arm extending therefrom, means for automatically operating the planing surface as the float is moved, an arm controlled by the last said means, and a shock-absorbing member connecting the arms.

ALFRED B. HERB.